US010577935B2

(12) United States Patent
Takemoto et al.

(10) Patent No.: US 10,577,935 B2
(45) Date of Patent: Mar. 3, 2020

(54) TURBINE BLADE MOUNTING STRUCTURE (71) Applicant: IHI CORPORATION, Koto-ku (JP)

(72) Inventors: Tsuyoshi Takemoto, Koto-ku (JP); Jun Tateishi, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/572,396

(22) PCT Filed: Jan. 26, 2016

(86) PCT No.: PCT/JP2016/052156
§ 371 (c)(1),
(2) Date: Nov. 7, 2017

(87) PCT Pub. No.: WO2016/185732
PCT Pub. Date: Nov. 24, 2016

(65) Prior Publication Data
US 2018/0112532 A1    Apr. 26, 2018

(30) Foreign Application Priority Data

May 15, 2015 (JP) ................................. 2015-100018

(51) Int. Cl.
F01D 5/08         (2006.01)
F01D 5/30         (2006.01)
(Continued)

(52) U.S. Cl.
CPC .............. F01D 5/081 (2013.01); F01D 5/14 (2013.01); F01D 5/30 (2013.01); F01D 5/3007 (2013.01);
(Continued)

(58) Field of Classification Search
CPC ... F01D 5/081; F01D 5/14; F01D 5/30; F01D 5/3007; F01D 11/00; F01D 25/00;
(Continued)

(56) References Cited

U.S. PATENT DOCUMENTS 6,176,677 B1     1/2001   Chevrefils et al.
7,264,448 B2 *   9/2007   Garner .................. F01D 5/3015
                                                    416/212 R
(Continued)

FOREIGN PATENT DOCUMENTS

FR     2 973 433 A1    10/2012
JP     S46-011683       3/1971
(Continued)

OTHER PUBLICATIONS

International Search Report dated May 10, 2016, in PCT/JP2016/052156 filed Jan. 26, 2016.

Primary Examiner — Joseph J Dallo
Assistant Examiner — Yi-Kai Wang
(74) Attorney, Agent, or Firm — Oblon, McClelland, Maier & Neustadt, L.L.P.

(57) ABSTRACT

A guiding surface expanding to the outer circumferential side from the upstream side toward the downstream side is formed on the support section, a guided surface expanding to the outer circumferential side from the upstream side toward the downstream side is formed at an end portion on the outer circumferential side of the shielding member, and the shielding member covers a gap between the disc and the turbine blade in the fitting section in a state in which the guided surface abuts against the guiding surface at least when the disc is rotationally driven.

11 Claims, 7 Drawing Sheets (51) Int. Cl.
*F01D 11/00* (2006.01)
*F01D 5/14* (2006.01)
*F02C 7/18* (2006.01)
*F02C 7/28* (2006.01)
*F01D 25/00* (2006.01)

(52) U.S. Cl.
CPC .............. *F01D 11/00* (2013.01); *F01D 25/00* (2013.01); *F02C 7/18* (2013.01); *F02C 7/28* (2013.01); *F05D 2220/32* (2013.01); *F05D 2260/20* (2013.01); *F05D 2260/30* (2013.01)

(58) Field of Classification Search
CPC .......... F02C 7/18; F02C 7/28; F05D 2220/32; F05D 2260/20; F05D 2260/30
USPC ...................................... 416/219 R
See application file for complete search history.

(56) References Cited

U.S. PATENT DOCUMENTS

| | | | |
|---|---|---|---|
| 9,803,485 B2* | 10/2017 | Snyder | F01D 5/3015 |
| 10,060,276 B2* | 8/2018 | Tanaka | F01D 11/003 |
| 2005/0095129 A1 | 5/2005 | Benjamin et al. | |
| 2009/0022592 A1 | 1/2009 | Liotta et al. | |
| 2010/0014986 A1* | 1/2010 | Traverso | F01D 5/081 |
| | | | 416/97 R |
| 2010/0232938 A1 | 9/2010 | Harris, Jr. et al. | |
| 2011/0268564 A1 | 11/2011 | Martin et al. | |
| 2011/0318187 A1 | 12/2011 | Garcia-Crespo | |
| 2012/0034087 A1* | 2/2012 | Dungs | F01D 5/3015 |
| | | | 416/219 R |
| 2012/0275920 A1 | 11/2012 | Delvaux et al. | |
| 2013/0202433 A1 | 8/2013 | Hafner | |

FOREIGN PATENT DOCUMENTS

| | | |
|---|---|---|
| JP | S48-025686 | 7/1973 |
| JP | 61-205302 A | 9/1986 |
| JP | 7-026905 A | 1/1995 |
| JP | 8-086202 A | 4/1996 |
| JP | 8-296455 A | 11/1996 |
| JP | 11-247616 A | 9/1999 |
| JP | 2003-500586 A | 1/2003 |
| JP | 2005-307981 A | 11/2005 |
| JP | 2009-024698 A | 2/2009 |
| JP | 2009-236060 A | 10/2009 |
| JP | 2010-025110 A | 2/2010 |
| JP | 2010-216474 A | 9/2010 |
| JP | 2012-007606 A | 1/2012 |
| JP | 2012-510580 A | 5/2012 |
| JP | 2012-522169 A | 9/2012 |
| JP | 2013-160229 A | 8/2013 |
| WO | WO 2015/044578 A1 | 4/2015 |

* cited by examiner

TURBINE BLADE MOUNTING STRUCTURE

TECHNICAL FIELD

The present disclosure relates to a turbine blade mounting structure. This application is based on Japanese Patent Application No. 2015-100018 filed on May 15, 2015 and claims the benefit of priority thereto, the entire contents of which are incorporated herein by reference.

BACKGROUND ART

Patent Literature 1 discloses a turbine blade mounting structure of a jet engine, in which a turbine blade is mounted on an outer circumferential edge of a disc that is rotationally driven. In the turbine blade mounting structure, a plurality of grooves is formed on the outer circumferential edge of the disc, and an end portion of an inner circumferential side of the turbine blade is fitted to each groove.

CITATION LIST

Patent Literature

Patent Literature 1: Japanese Unexamined Patent Publication No. H7-26905

SUMMARY

Technical Problem

Here, in some cases, the jet engine has a configuration in which some of taken air as cooling air (cooling fluid) flows to the disc to cool the disc. However, when the cooling air flows into a gap between the turbine blade and disc, there is a possibility that excessive cooling air flows to the disc side. In this way, when the cooling air increases more than necessary, in some cases, by a decrease in mainstream flow rate of air, the performance of the jet engine is degraded.

Accordingly, the present disclosure illustrates a turbine blade mounting structure capable of adjusting the flow rate of cooling fluid flowing to the disc side.

Solution to the Problem

A turbine blade mounting structure according to an aspect of the present disclosure is a turbine blade mounting structure in which a turbine blade is mounted to an outer circumferential edge of a disc rotationally driven, the turbine blade mounting structure including: a fitting section formed by fitting an end portion on an inner circumferential side of the turbine blade to a groove extending in a direction of a rotation axis at the outer circumferential edge of the disc; a shielding member which is disposed on an end surface on an upstream side of the fitting section to shield fluid flowing to the fitting section; and a support section which supports an end portion on an outer circumferential side of the shielding member at least when the disc is rotationally driven. A guiding surface expanding to the outer circumferential side from the upstream side toward the downstream side is formed on the support section, a guided surface expanding to the outer circumferential side from the upstream side toward the downstream side is formed at an end portion on the outer circumferential side of the shielding member, and the shielding member covers a gap between the disc and the turbine blade in the fitting section in a state in which the guided surface abuts against the guiding surface at least when the disc is rotationally driven.

Advantageous Effects

According to the present disclosure, it is possible to adjust the flow rate of the cooling fluid flowing to the disc side.

BRIEF DESCRIPTION OF DRAWINGS

FIG. 4(a) illustrates a state in which no centrifugal force acts on the shielding member, and FIG. 4(b) illustrates a state in which centrifugal force acts on the shielding member.

DESCRIPTION OF EMBODIMENTS

In the turbine blade mounting structure according to an aspect of the present disclosure, a guiding surface expanding to the outer circumferential side from an upstream side toward a downstream side is formed in a support section that supports an end portion of the outer circumferential side of the shielding member. A guided surface expanding to the outer circumferential side from the upstream side toward the downstream side is formed at the end portion of the outer circumferential side of the shielding member. Therefore, when a centrifugal force acts on the shielding member toward the outer circumferential side by rotational driving of the disc, the guided surface abuts on the guiding surface and is guided, and thus, a force directed toward the downstream side acts on the shielding member. The shielding member covers a gap between the disc and the turbine blade in the fitting section in a state in which the guided surface abuts on the guiding surface at least when the disc is rotationally driven. Thus, in a state in which the shielding member is pressed against the fitting section on the downstream side, the shielding member can cover the gap between the disc and the turbine blade in the fitting section to shield the fluid. This makes it possible to adjust the flow rate of the fluid flowing into the gap between the disc and the turbine blade. Therefore, it is possible to adjust the flow rate of the cooling fluid flowing to the disc side.

In the turbine blade mounting structure according to an aspect of the present disclosure, the guiding surface and the guided surface may be inclined surfaces which are inclined to the outer circumferential side from the upstream side toward the downstream side. Therefore, when the centrifugal force acts on the shielding member, the shielding member is smoothly pressed against the fitting section on the downstream side.

In the turbine blade mounting structure according to an aspect of the present disclosure, the shielding member may be formed with a communicating section that allows a space on the upstream side of the shielding member to communicate with the gap. As a result, some of the cooling fluid can be made to flow into the gap between the turbine blade and the disc, which makes it possible to finely adjust the flow rate of the cooling fluid flowing to the disc side.

Embodiments of the present disclosure will be described in detail with reference to the drawings. In the description of the drawings, the same elements or the corresponding elements are denoted by the same reference numerals, and repeated explanations may be omitted.

Figure 1:
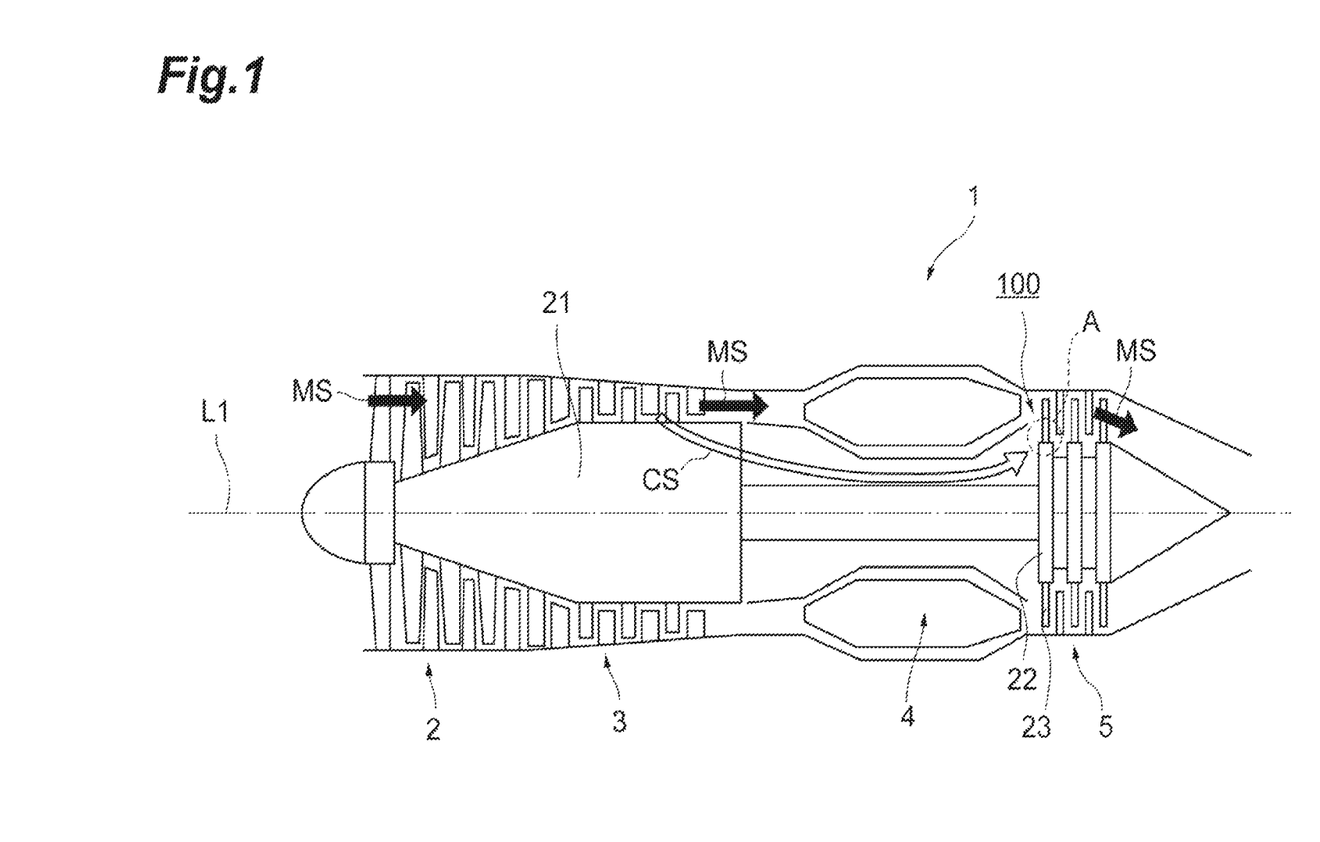
FIG. 1 is a schematic cross-sectional view illustrating a schematic configuration of a jet engine equipped with a turbine blade mounting structure according to the present disclosure.

FIG. 1 is a schematic cross-sectional view illustrating a schematic configuration of a jet engine equipped with a turbine blade mounting structure according to the present embodiment. A jet engine 1 of the present embodiment includes a fan 2, a compressor 3, a combustor 4, and a turbine 5.

The fan 2 is intended to take outside air into the jet engine 1, and has a plurality of moving blades arranged around a rotation axis L1 of a shaft section 21 to be rotationally driven. The compressor 3 compresses the air which was taken in by the fan 2. The compressor 3 has a configuration in which the rotating blades to be rotationally driven and the fixed stationary blades are alternately arranged in a plurality of stages in the flowing direction of air. The combustor 4 combusts the air compressed by the compressor 3 with the fuel. The combustor 4 includes a fuel supply mechanism (not illustrated) and an ignition device (not illustrated). The turbine 5 converts some of the velocity energy of the combustion gas generated by combustion of air and fuel in the combustor 4 into rotational energy. The turbine 5 drives the fan 2 and the compressor 3 by the rotational energy. The turbine 5 has a disc 22 to be rotatably driven by being connected to the shaft section 21, and a plurality of turbine blades 23 arranged around the rotation axis L1 on the outer circumferential edge of the disc 22.

In the jet engine 1 having such a configuration, the air is taken into the jet engine 1 by the fan 2. Further, the air supplied to the compressor 3 is compressed by the compressor 3 and then is combusted with the fuel in the combustor 4. Some of the velocity energy of the combustion gas generated by combustion is converted into rotational energy by the turbine 5, and is used for driving the fan 2 and the compressor 3. Meanwhile, the remaining velocity energy of the combustion gas is used to impart propulsive force to the jet engine 1 when the combustion gas is exhausted from the rear part of the jet engine 1. As a result, the jet engine 1 propels. The flow of the air and combustion gas is taken as main stream MS. Some of the air in the compressor 3 passes through the flow channel on the inner circumferential side of the combustor 4 and is used as the cooling air CS of the disc 22 in the turbine 5. In this specification, the direction along the rotation axis L1 is referred to as a "rotation axis direction", and the terms "upstream side" and "downstream side" are used on the basis of the flow of air which is taken in the jet engine 1. That is, in FIGS. 1, 2, 4, 6 and 7, the left side of the sheet corresponds to an "upstream side" and the right side of the sheet corresponds to a "downstream side." Also, the terms "outer circumference side" and "inner circumference side" are used on the basis of the rotation axis L1.

Figure 2:
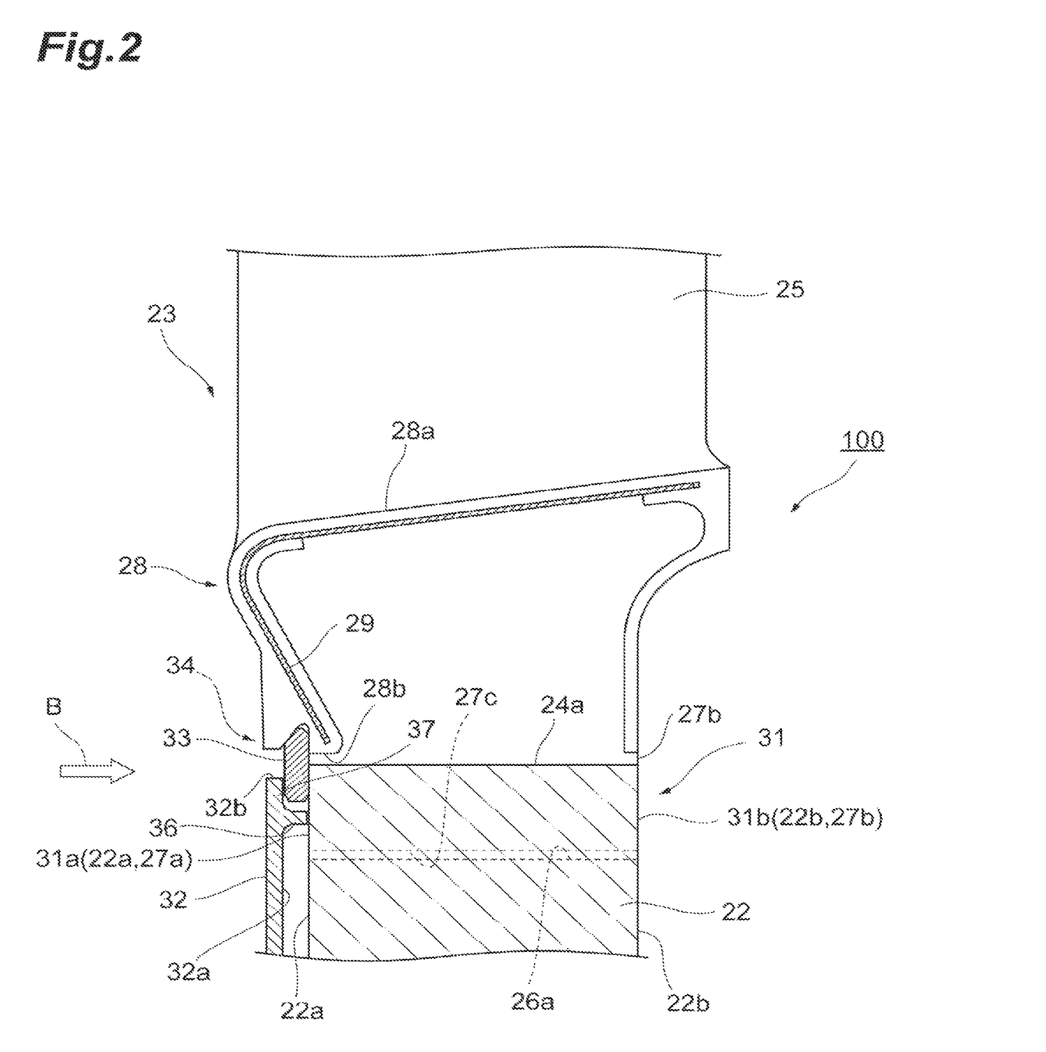
FIG. 2 is an enlarged view of a portion denoted by A in FIG. 1, and is an enlarged sectional view of the turbine blade mounting structure.

Next, a turbine blade mounting structure 100 according to the present embodiment will be described. FIG. 2 is an enlarged view of a portion denoted by A in FIG. 1, which is an enlarged sectional view of the turbine blade mounting structure 100. FIG. 2 is a cross-sectional view taken along a line II-II in FIG. 3. As illustrated in FIG. 2, the turbine blade mounting structure 100 includes a fitting section 31, a support 32, a shielding member 33, and a support section 34. The fitting section 31 fits the turbine blade 23 with the disc 22. The support 32 supports the turbine blade 23 at the fitting section 31. The shielding member 33 shields the flow of the cooling air CS to the gap between the disc 22 and the turbine blade 23 in the fitting section 31. The support section 34 supports the end portion on the outer circumferential side of the shielding member 33 at least when the disc 22 is rotationally driven.

Figure 3:
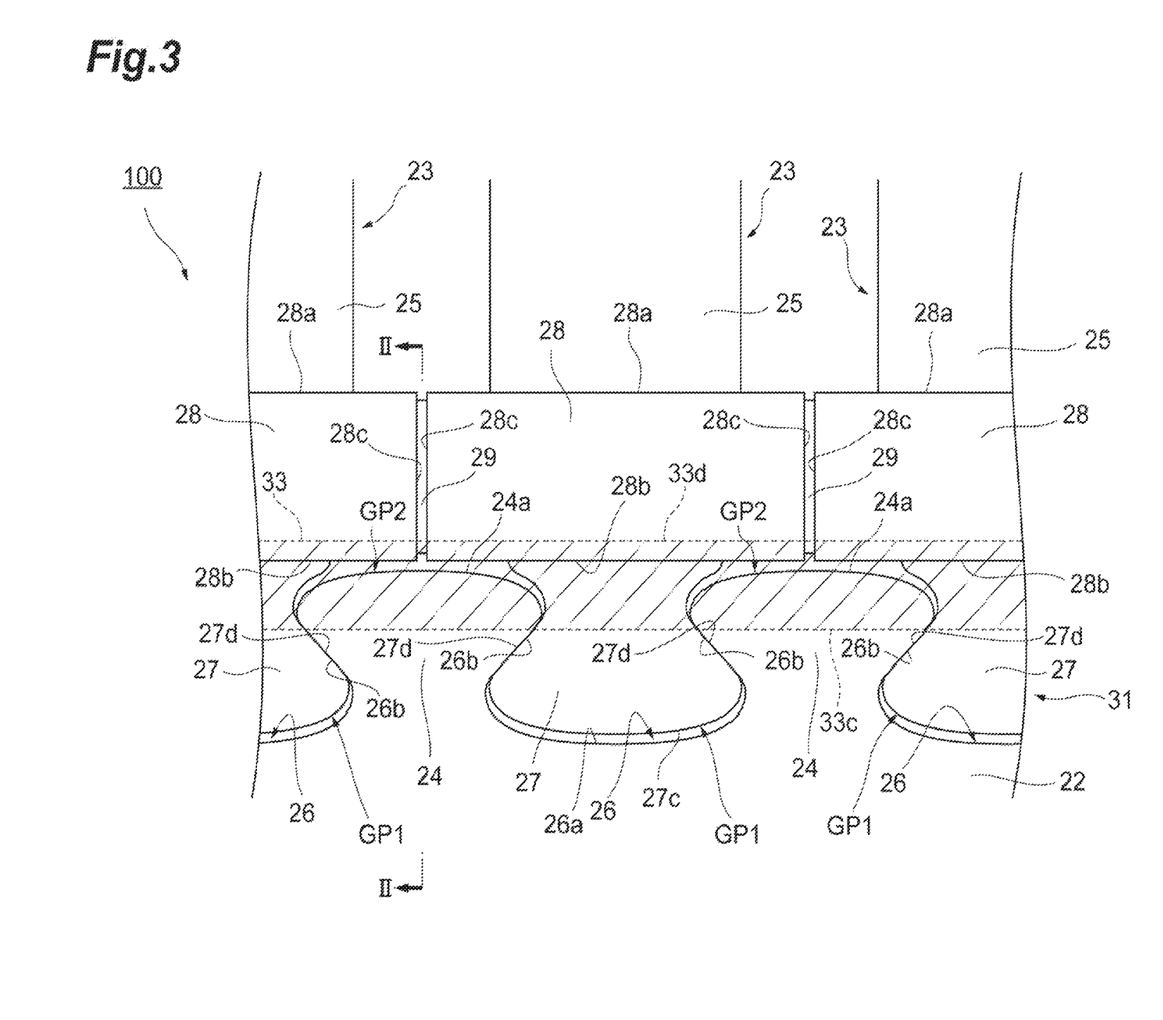
FIG. 3 is a view of a fitting section as viewed from a direction indicated by B in FIG. 2.

The fitting section 31 will be described with reference to FIGS. 2 and 3. FIG. 3 is a view of the fitting section 31 as viewed from the direction indicated by B in FIG. 2 (that is, as viewed from the upstream side in direction of the rotation axis). However, in FIG. 3, in order to illustrate the gap between the turbine blade 23 and the disc 22, the support 32 is omitted, and the shielding member 33 is indicated by a broken line. On the outer circumferential edge of the disc 22, a plurality of protrusions 24 and a plurality of grooves 26 are alternately formed in the circumferential direction. The grooves 26 are formed between a pair of adjacent protrusions 24. The protrusions 24 and the grooves 26 extend in the direction of the rotation axis between the upstream end surface 22a and the downstream end surface 22b of the disc 22. The protrusion 24 is a section called a dovetail post. The protrusion 24 has a substantially fan-like shape in which the width of the distal end portion on the outer circumferential side is larger than the width of the proximal end portion on the inner circumferential side. The groove 26 is a section referred to as a disc dovetail. The groove 26 has a substantially fan-like shape in which the width of the bottom section on the inner circumferential side is larger than the width of the opening section on the outer circumferential side. The groove 26 includes a bottom surface 26a expanding to the inner circumferential side, and side surfaces 26b and 26b expanding from both ends in the width direction of the bottom surface 26a to the outer circumferential side. The side surfaces 26b and 26b are constituted by the side surfaces of the protrusion 24 and are inclined so that the widths thereof become narrower toward the outer circumferential side. The protrusion 24 has a distal end surface 24a that expands to the outer circumferential side.

The turbine blade 23 includes a blade section 25, a protrusion 27, and a platform 28. The blade section 25 extends in the radial direction. The protrusion 27 is fitted to the groove 26 of the disc 22. The platform 28 supports the protrusion 27 at the end portion on the inner circumferential side of the blade section 25. The protrusion 27 is a section called a moving blade dovetail, and has a shape corresponding to the groove 26. That is, the protrusion 27 has a substantially fan-like shape in which the width of the distal end portion on the inner circumferential side is larger than the width of the proximal end portion on the outer circumferential side (a connecting section with the platform 28). The distal end portion on the inner circumferential side of the protrusion 27 is disposed on the bottom section on the inner circumferential side of the groove 26. The proximal end portion on the outer circumferential side of the protrusion 27 is disposed in the opening section on the outer circumferential side of the groove 26. The protrusion 27 includes a distal end surface 27c expanding to the inner circumferential side, and side surfaces 27d and 27d expanding from both ends of the distal end surface 27c in the width direction to the outer circumferential side. The side surfaces 27d and 27d are inclined so that the width becomes narrower toward the outer circumferential side.

The end surface 27a on the upstream side of the protrusion 27 is disposed to form the same plane as the end surface 22a on the upstream side of the disc 22. The end surface formed by the end surface 27a of the protrusion 27 and the end surface 22a of the disc 22 is referred to as an "end surface 31a on the upstream side of the fitting section 31."

The platform 28 includes an outer circumferential surface 28a to which the end portion on the inner circumferential side of the blade section 25 is fixed, an inner circumferential surface 28b to which the proximal end portion of the protrusion 27 is fixed, and a side surface 28c formed on both end sides in the circumferential direction. In the present embodiment, the inner circumferential surface 28b of the platform 28 extends in the circumferential direction to cover the distal end surface 24a of the protrusion 24 of the disc 22. One side surface 28c of the platform 28 of the turbine blade 23 faces the other side surface 28c of the platform 28 of the adjacent turbine blade 23. A seal member 29 is disposed between the side surfaces 28c facing each other. On an end surface on the upstream side of the platform 28, a support section 34 which supports the shielding member 33 is formed. Details of the configuration of the support section 34 will be described later together with the configuration of the shielding member 33.

A gap is formed between the turbine blade 23 and the disc 22 in the fitting section 31 having the aforementioned configuration. The gap of the fitting section 31 will be described with reference to FIG. 3. FIG. 3 illustrates a state in which a centrifugal force directed toward the outer circumferential side acts on the turbine blade 23 by the rotational driving of the disc 22. As illustrated in FIG. 3, the side surface 27d of the protrusion 27 of the turbine blade 23 comes into contact with the side surface 26b of the groove 26 of the disc 22. In this state, a gap GP1 is formed between the bottom surface 26a of the groove 26 and the distal end surface 27c of the protrusion 27. In the following description, the gap GP1 existing on the inner circumferential side of the contact section between the side surface 27d and the side surface 26b is referred to as a "gap GP1 on the inner circumferential side." Further, a gap is formed between the distal end surface 24a of the protrusion 24 of the disc and the inner circumferential surface 28b of the platform 28. In the following description, the gap GP 2 existing on the outer circumferential side of the contact section between the side surface 27d and the side surface 26b is referred to as a "gap GP 2 on the outer circumferential side."

As illustrated in FIG. 2, the support 32 is an annular plate material that covers the end surface 22a on the upstream side of the disc 22. The support 32 is disposed at a position spaced apart from the end surface 22a on the upstream side of the disc 22 toward the upstream side. A support section 36 which supports the end surface 31a on the upstream side of the fitting section 31 is formed on the back surface 32a of the support 32. The support section 36 is an annular wall section protruding from the back surface 32a of the support 32 toward the end surface 31a on the upstream side of the fitting section 31. The support section 36 is formed at a position spaced apart from the outer circumferential surface 32b of the support 32 to the inner circumferential side. Further, in the outer circumferential edge portion of the support 32, a portion on a side closer to the outer circumferential side than the support section 36 functions as a flange section 37 which prevents extraction of the shielding member 33. By pressing the fitting section 31, the support section 36 prevents the protrusion 27 of the turbine blade 23 from falling out of the groove 26 of the disc 22.

Figure 4:
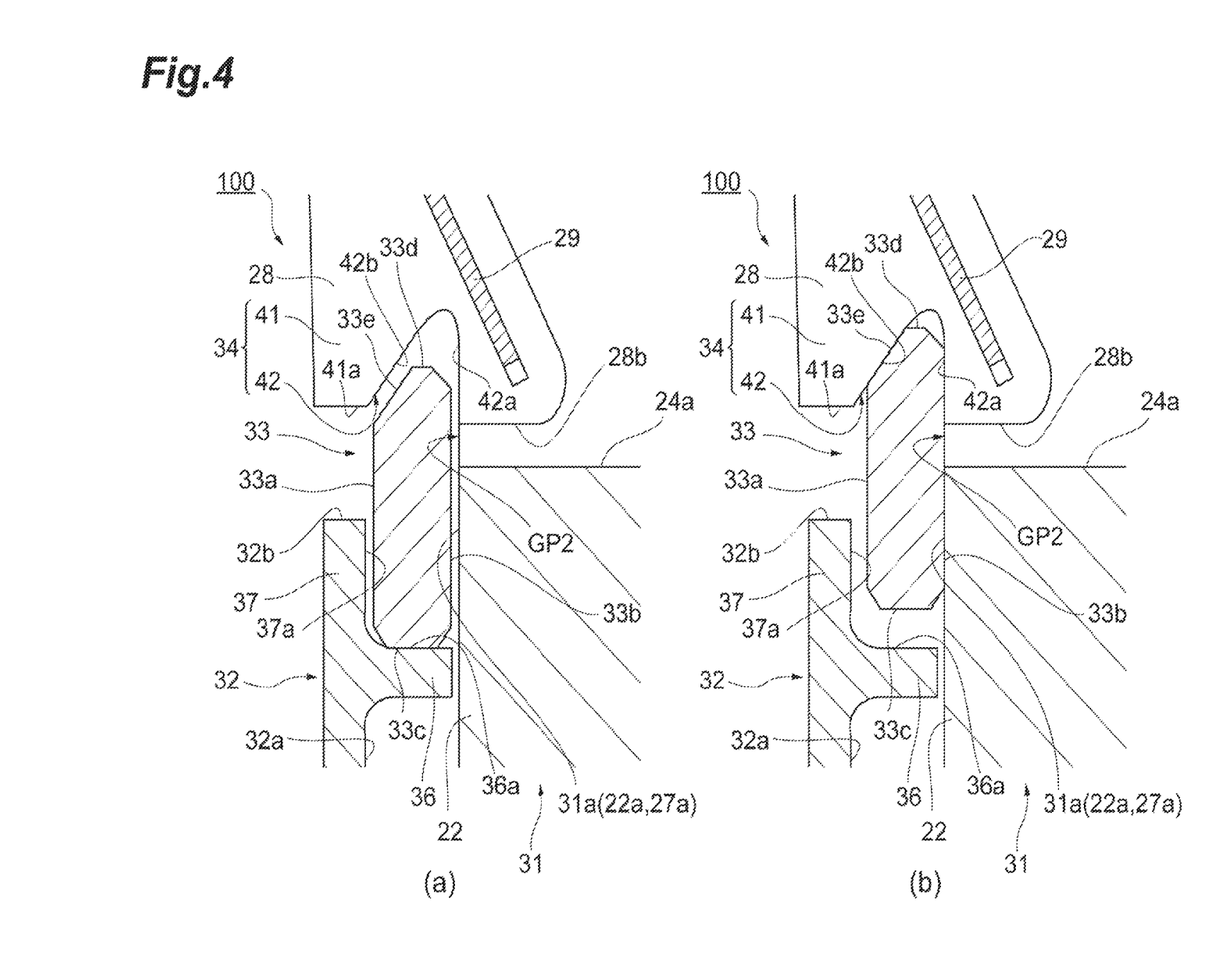
FIG. 4 is an enlarged view illustrating a structure around a shielding member of the turbine blade mounting structure.

Next, the configurations of the shielding member 33 and the support section 34 will be described in detail with reference to FIG. 4. FIG. 4 is an enlarged view illustrating the structure around the shielding member 33, in the turbine blade mounting structure 100. FIG. 4(a) illustrates a state in which no centrifugal force acts on the shielding member 33, and FIG. 4(b) illustrates a state in which a centrifugal force acts on the shielding member 33. The shielding member 33 is an annular member that covers a gap between the disc 22 and the turbine blade 23 in the fitting section 31. In the present embodiment, the shielding member 33 covers the gap GP2 on the outer circumferential side (in FIG. 3, a portion covered with the shielding member 33 is illustrated by hatching). The shielding member 33 is disposed in the space between the end surface 31a on the upstream side of the fitting section 31 and the flange section 37 of the support 32, on the outer circumference side of the support section 36 of the support 32. The shielding member 33 is made of a material having high heat resistance, and is made of, for example, nickel or a composite material.

The shielding member 33 has an upstream end surface 33a, a downstream end surface 33b, an inner circumferential surface 33c, an outer circumferential surface 33d, and a guided surface 33e. The end surface 33a faces the back surface 37a of the flange section 37 of the support 32. The end surface 33b faces the end surface 31a on the upstream side of the fitting section 31. The inner circumferential surface 33c faces the outer circumferential surface 36a of the support section 36 of the support 32. The outer circumferential surface 33d is supported by a support section 34 formed on the platform 28. The guided surface 33e is formed between the upstream end surface 33a and the outer circumferential surface 33d. The guided surface 33e is a surface formed at an end portion on the outer circumferential side of the shielding member 33. The guided surface 33e is a surface that comes into contact with a guiding surface 42b of the support section 34 to be described later. The guided surface 33e has a shape that expands to the outer circumferential side from the upstream side toward the downstream side. In the present embodiment, the guided surface 33e is an inclined surface which is inclined to the outer circumferential side from the upstream side toward the downstream side. When viewing the cross section of the shielding member 33 (that is, the cross section illustrated in FIG. 4), the guided surface 33e linearly extends from the upstream end surface 33a toward the outer circumferential surface 33d on the outer circumferential side.

The support section 34 is constituted by forming a groove 42 on a wall section 41 disposed at a position on the outer circumferential side of the shielding member 33. The wall section 41 is a part of the platform 28. The wall section 41 is a section that protrudes to the upstream side from the end surface 31a on the upstream side of the fitting section 31, at the position on the outer circumferential side of the fitting section 31. The groove 42 is formed on the inner circumferential surface 41a of the protruding wall section 41 to extend in the circumferential direction. Further, as long as the support section 34 has a structure capable of supporting the shielding member 33, the support section 34 may not be provided on the turbine blade 23 side. The support section 34 may be formed by adding a predetermined support mechanism or the like to the disc side.

The groove 42 includes a receiving surface 42a which receives the end surface 33b on the downstream side of the shielding member 33, and a guiding surface 42b which guides the guided surface 33e of the shielding member 33. The receiving surface 42a is the same plane continued with the end surface 31a on the upstream side of the fitting section 31. The guiding surface 42b is a surface which comes into contact with the guided surface 33e of the shielding member 33 when centrifugal force acts on the shielding member 33. The guiding surface 42b has a shape that expands to the outer circumferential side from the upstream side toward the downstream side. In the present embodiment, the guiding surface 42b is an inclined surface which is inclined to the outer circumferential side from the upstream side toward the downstream side. When viewing the cross-section (that is, the cross-section illustrated in FIG. 4) of the support section 34, the guiding surface 42b linearly extends from the inner circumferential surface 41a of the wall section 41 toward the bottom section on the outer circumferential side of the groove 42. An angle of the guiding surface 42b and the guided surface 33e with respect to direction of the rotation axis is not particularly limited, but the angle may be set to 30° to 80° in order to efficiently convert some of the centrifugal force to the pressing force toward the downstream side.

The shielding member 33 is in a state of being prevented from falling out by being housed in the space formed by the disc 22, the support section 34, and the support 32. However, the shielding member 33 is not fixed to any member, and is in a free state in the space (a state in which movement in a space is permitted). When the disc 22 is not rotationally driven, no centrifugal force acts on the shielding member 33. Therefore, as illustrated in FIG. 4(a), the shielding member 33 is in a state of being spaced apart from the support section 34. Meanwhile, when the disc 22 is rotationally driven, a centrifugal force acts on the shielding member 33 toward the outer circumferential side. In this state, as illustrated in FIG. 4(b), the shielding member 33 is in a state of being supported by the support section 34. Specifically, the guided surface 33e of the shielding member 33 abuts on the guiding surface 42b of the support section 34. At the same time, the end surface 33b on the downstream side of the shielding member 33 abuts on the receiving surface 42a of the support section 34 and the end surface 31a on the upstream side of the fitting section 31. Thus, the gap GP2 of the fitting section 31 is blocked by the shielding member 33.

In the present embodiment, as illustrated in FIG. 3, in a state in which the shielding member 33 is supported by the support section 34, the inner circumferential surface 33c of the shielding member 33 is disposed at the positions of the side surfaces 26b and 27d that abut on each other as load receiving surfaces. Therefore, the entire region of the gap GP2 on the outer circumferential side of the fitting section 31 in the radial direction is blocked by the shielding member 33. The size of the shielding member 33 in the radial direction is not particularly limited, and for example, the inner circumferential surface 33c of the shielding member 33 may come to the gap GP2. That is, a region that is not blocked by the shielding member 33 may exist in a part of the gap GP2.

Figure 5:
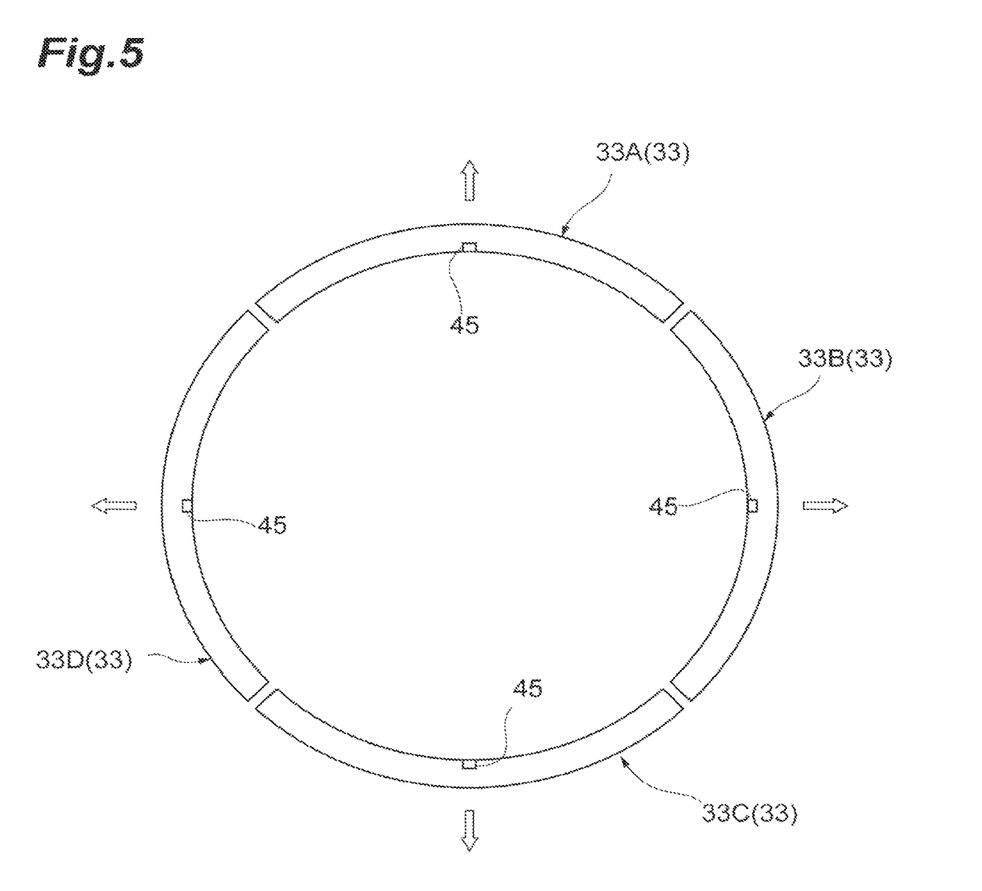
FIG. 5 is a view of the shielding member as viewed from a direction of the rotation axis.
Figure 6:
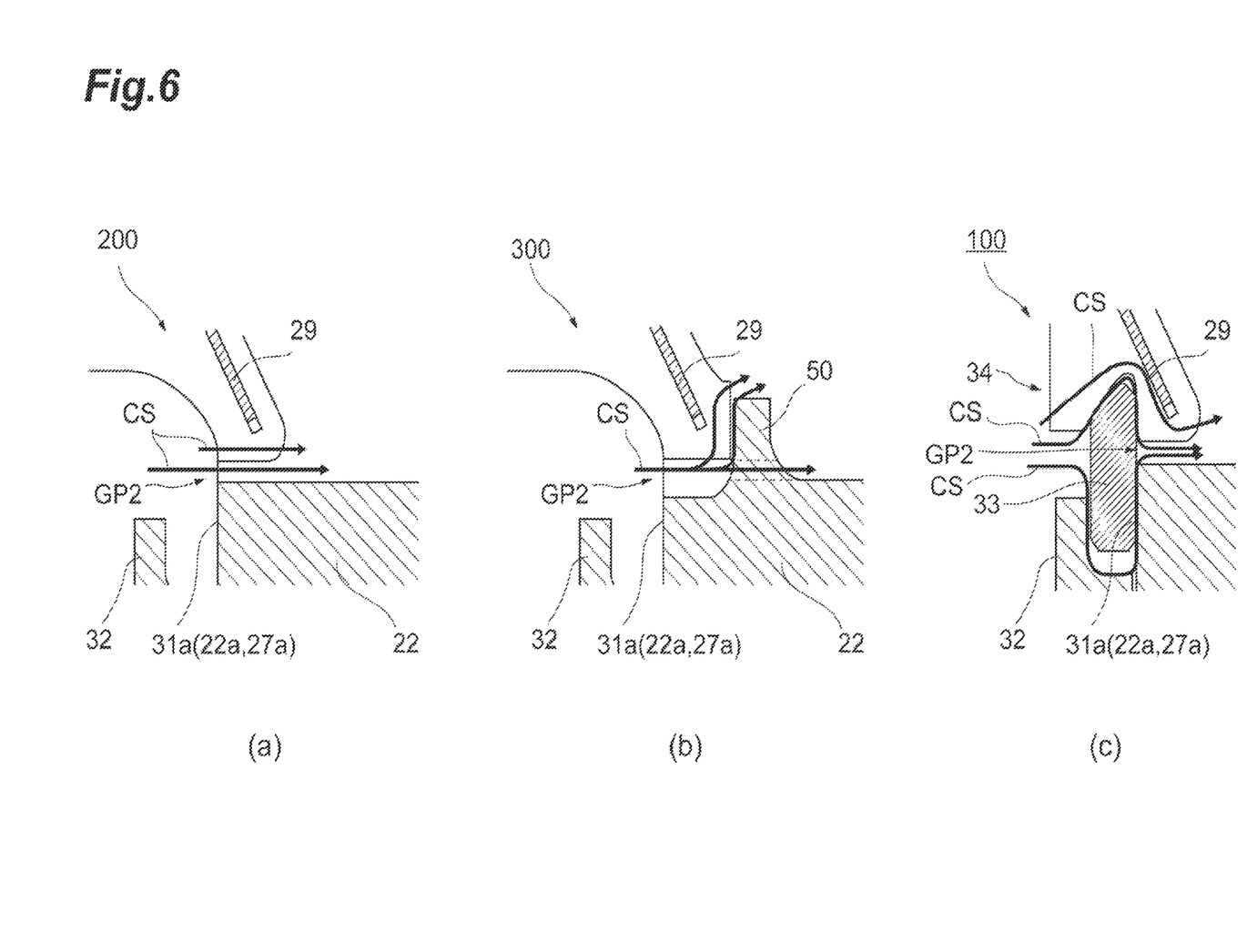
FIGS. 6(a) and 6(b) are enlarged views illustrating the flow of cooling air in a turbine blade mounting structure according to a comparative example.
FIG. 6(c) is an enlarged view illustrating a flow of cooling air in the turbine blade mounting structure according to the present disclosure.
Figure 7:
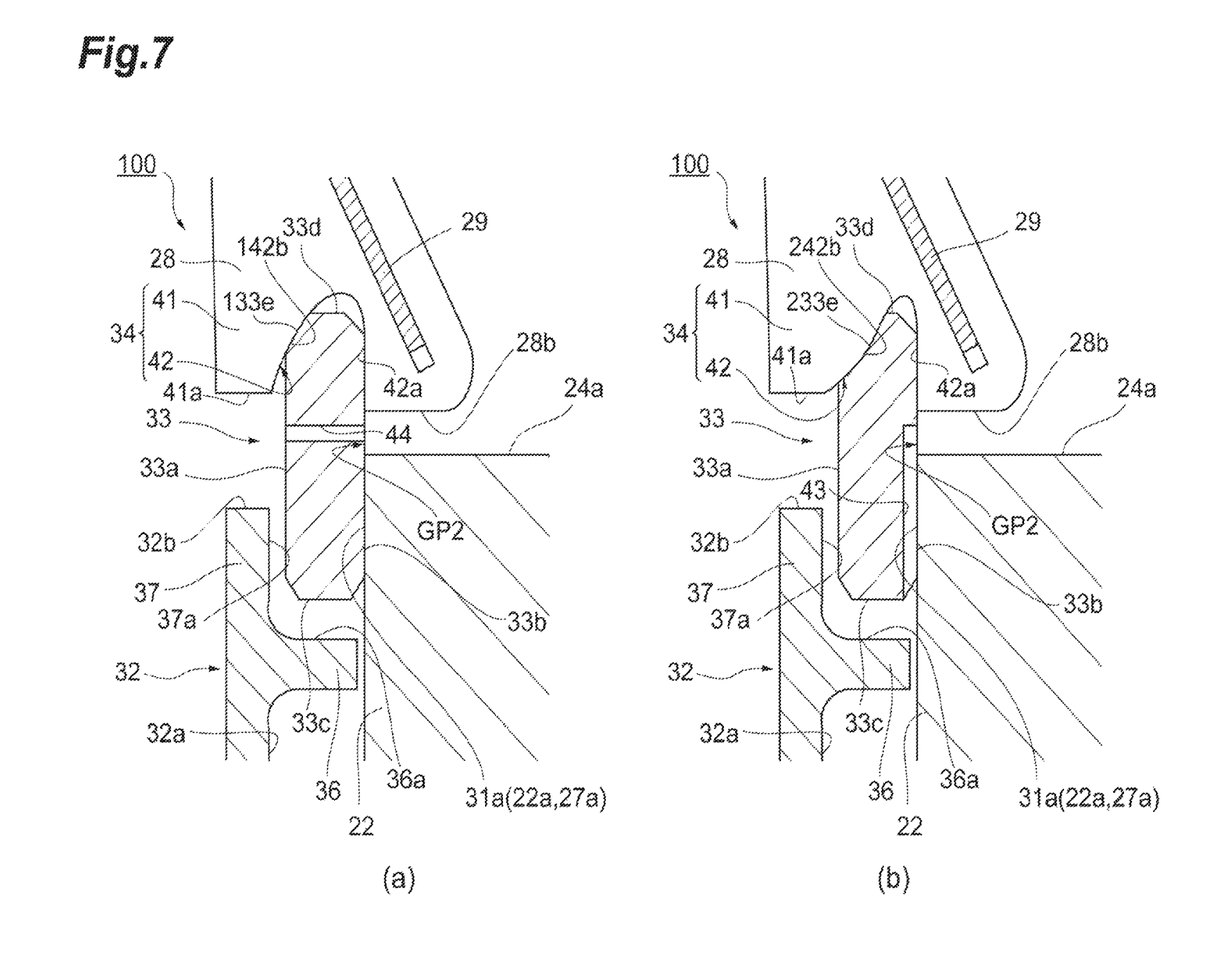
FIGS. 7(a) and 7(b) are views illustrating a shielding member of a turbine blade mounting structure according to a modified example.

Further, as illustrated in FIG. 5, the shielding member 33 is divided into a plurality of pieces in the circumferential direction. In the present embodiment, the shielding member 33 is divided into four pieces 33A, 33B, 33C, and 33D. For example, when the shielding member 33 is a single annular member that is not divided, the shielding member 33 may interfere with the wall section 41 of the support section 34 at the time of assembling. In addition, there is a possibility that the shielding member 33 may be deformed by the influence of thermal expansion. Meanwhile, by dividing the shielding member 33 into a plurality of pieces, the shielding member 33 is easily assembled, and it is possible to suppress the deformation due to the influence of thermal expansion. Further, a centrifugal force directed toward the outer circumferential edge acts on the respective pieces 33A, 33B, 33C, and 33D, as indicated by an arrow in FIG. 5. However, the number of divisions of the shielding member 33 is not particularly limited, and may be two or more. Further, the shielding member 33 may be finely divided, and a piece may be provided for a single turbine blade 23. Each of the pieces 33A, 33B, 33C, and 33D of the shielding member 33 is formed with a detent 45 which prevents movement in the circumferential direction. The detent 45 may protrude from the end surface of the shielding member 33. The detent 45, for example, may be fitted to a groove (not illustrated) formed in the support 32 to restrict the movement of the shielding member 33 in the circumferential direction. Alternatively, the detent 45 may be provided by forming a groove on the end surface of the shielding member 33. The detent 45 may restrict the movement of the shielding member 33 in the circumferential direction, by fitting a protrusion (not illustrated) formed on the support 32. Further, the end surface of the shielding member 33 may be cut obliquely.

The shielding member 33 may be provided over the whole circumference of the fitting section 31, but the shielding member 33 may be provided in a partial region of the fitting section 31 in the circumferential direction. That is, in the partial region of the fitting section 31 in the circumferential direction, the flow of the cooling air CS is shield by the shielding member 33, and by not providing the shielding member 33 in the other partial region, the flow rate of the cooling air may be adjusted.

The guided surface 33e of the shielding member 33 may be formed over the entire region of the shielding member in the circumferential direction, but the guided surface 33e may be formed only in a partial region in the circumferential direction. For example, in the circumferential direction, a region provided with the guided surface 33e and a region not provided with the guided surface 33e may be alternately formed at regular intervals. However, it is necessary to provide the guided surface 33e in at least one place of one piece of the shielding member 33.

Next, the operation and effect of the turbine blade mounting structure 100 according to the present embodiment will be described.

FIG. 6(a) is an enlarged view illustrating the flow of the cooling air CS in the turbine blade mounting structure according to the comparative example. The turbine blade mounting structure according to the comparative example illustrated in FIG. 6(a) does not include a shielding member. Accordingly, the cooling air CS linearly flows into the gap GP2 between the disc 22 and the turbine blade 23. Therefore, in some cases, when the excessive cooling air CS is extracted from the main stream MS of the air flow of the jet engine 1, the performance of the jet engine 1 may be degraded. FIG. 6(b) is an enlarged view illustrating the flow of the cooling air CS in the turbine blade mounting structure according to another comparative example. The turbine blade mounting structure illustrated in FIG. 6(b) includes a shielding section 50 that protrudes from the distal end surface 24a of the protrusion 24 of the disc 22 to the outer circumferential side. However, in such a shielding section 50, since it is not possible to sufficiently block the gap GP2, the cooling air CS linearly flows in a part of the gap GP2.

Therefore, in some cases, it is not possible to sufficiently adjust the cooling air CS flowing to the disc 22 side. When adopting the turbine blade mounting structure according to the comparative example, there is a possibility that the excessive cooling air CS may flow to the disc side. In this way, when the cooling air CS excessively increases, in some cases, the flow rate of the main stream MS of the air decreases, which lead to degradation of the performance of the jet engine.

Meanwhile, in the turbine blade mounting structure 100 according to the present embodiment, a guiding surface 42b expanding to the outer circumferential side from the upstream side toward the downstream side is formed in the support section 34 that supports the outer circumferential end portion of the shielding member 33. A guided surface 33e, which expands to the outer circumferential side from the upstream side toward the downstream side and abuts on the guiding surface 42b, is formed at the end portion of the outer circumferential side of the shielding member 33. Therefore, when the centrifugal force acts on the shielding member 33 by rotationally driving the disc 22, the guided surface 33e abuts on the guiding surface 42b and is guided, and thus, a force directed toward the downstream side acts on the shielding member 33.

For example, when the disc 22 is rotationally driven from the state illustrated in FIG. 4(a), a centrifugal force acts on the shielding member 33, and the shielding member 33 is pulled toward the outer circumferential side. At this time, the guided surface 33e of the shielding member 33 is brought into contact with and pressed against the guiding surface 42b of the support section 34. The guiding surface 42b and the guided surface 33e expand to the outer circumferential side from the upstream side toward the downstream side. Therefore, when the guided surface 33e of the shielding member 33 abuts on and is pressed against the guiding surface 42b of the support section 34, the guided surface 33e moves along the guiding surface 42b, and thus, the guided surface 33c moves toward the downstream side as well as the outer circumferential side. As a result, the whole shielding member 33 moves to the downstream side, and the end surface 33b on the downstream side of the shielding member 33 comes into contact with the end surface 31a on the upstream side of the fitting section 31 and the receiving surface 42a of the support section 34, and is pressed to the downstream side. In this manner, some of the centrifugal force acting on the shielding member 33 is converted into a pressing force against the end surface 31a of the fitting section 31. As a result, the shielding member 33 is pressed against the fitting section 31 in a state of covering the gap GP2 between the disc 22 and the turbine blade 23 in the fitting section 31.

In this state, as illustrated in FIG. 6(c), since the cooling air CS flowing into the disc 22 side is shielded by the shielding member 33, the cooling air CS is hard to flow linearly toward the gap GP2. This makes it possible to adjust the flow rate of the cooling air CS flowing into the gap GP2 between the disc 22 and the turbine blade 23. Therefore, it is possible to adjust the flow rate of the cooling air CS flowing to the disc 22 side.

When the shielding member is directly fixed to the fitting section 31, there is a possibility that a problem may occur due to a difference in thermal expansion between the members. Meanwhile, when the shielding member is fixed to the platform 28, the support 32 or the like and is disposed at a position spaced apart from the end surface 31a of the fitting section 31, it is not possible to sufficiently shield the cooling air CS. The shielding member 33 according to the present embodiment is in a state of not being fixed to any member, and is pressed against the end surface 31a of the fitting section 31 with sufficient force at the time of rotationally driving of the disc 22. Further, such a shielding structure can be achieved with a simple structure that merely forms the guiding surface and the guided surface.

Further, in the turbine blade mounting structure 100 of the present embodiment, the guiding surface 42b and the guided surface 33e are inclined surfaces which are inclined to the outer circumferential side from the upstream side toward the downstream side. Therefore, when the centrifugal force acts on the shielding member 33, the shielding member 33 is smoothly pressed against the fitting section 31 on the downstream side.

The present disclosure is not limited to the above-described embodiments.

In the above-described embodiment, as the guiding surface 42b and the guided surface 33e, the inclined surfaces which are inclined to the outer circumferential side from the upstream side toward the downstream side are adopted. However, as long as the guiding surface 42b and the guided surface 33e have the shape that expands to the outer circumferential side from the upstream side toward the downstream side, any shape may be adopted. For example, when viewing the cross-sections of the shielding member 33 and the support section 34 (that is, the cross section illustrated in FIG. 7), the guided surface and the guiding surface may be curved surfaces 133e and 142b (see FIG. 7(a)) which are curved and expand to protrude to the outer circumferential side, and may be curved surfaces 233e and 242b (see FIG. 7(b)) which are curved to protrude toward the inner circumferential side.

Further, for example, as illustrated in FIG. 7(a), the shielding member 33 may be formed with a communicating section 44 that allows the space on the upstream side of the shielding member 33 to communicate with the gap GP2. The communicating section 44 illustrated in FIG. 7(a) is constituted by a through-hole penetrating through the shielding member 33 in the direction of the rotation axis. As a result, the gap GP2 communicates with the space on the upstream side of the shielding member 33 via the communicating section 44. Alternatively, the communicating section 43 illustrated in FIG. 7(b) is formed by forming slots on the end surface 33b on the downstream side of the shielding member 33. As a result, some of the cooling air CS can flow through the gap GP 2 via the communicating sections 44 and 43, and it is possible to more finely adjust the amount of the cooling air CS flowing to the disc 22 side.

Further, as a structure of the fitting section of the turbine blade and the disc, the fitting section having a substantially fan shape is described as an example, but the shape of the fitting section is not particularly limited. For example, a so-called Christmas tree type fitting section having multiple wavy shapes on both side surfaces may be adopted.

REFERENCE SIGNS LIST 1 jet engine
5 turbine
22 disc
23 turbine blade
26 groove
31 fitting section
33 shielding member
33e guided surface
34 support section
42b guiding surface

The invention claimed is:

1. A turbine blade mounting structure in which a turbine blade is mounted to an outer circumferential edge of a disc to be rotationally driven, the turbine blade mounting structure comprising:
   a fitting section formed by fitting an end portion on an inner circumferential side of the turbine blade to a groove extending in a direction of a rotation axis at the outer circumferential edge of the disc;
   a shielding member which is disposed on an end surface on an upstream side of the fitting section to shield fluid flowing to the fitting section; and
   a support section which supports an end portion on an outer circumferential side of the shielding member at least when the disc is rotationally driven,
   wherein a guiding surface expanding to the outer circumferential side from the upstream side toward the downstream side is formed on the support section,
   a guided surface expanding to the outer circumferential side from the upstream side toward the downstream side is formed at an end portion on the outer circumferential side of the shielding member, and
   the shielding member covers a gap between the disc and the turbine blade in the fitting section in a state in which the guided surface abuts against the guiding surface at least when the disc is rotationally driven.

2. The turbine blade mounting structure according to claim 1, wherein the guiding surface and the guided surface are inclined surfaces which are inclined toward the outer circumferential side from the upstream side toward the downstream side.

3. The turbine blade mounting structure according to claim 1, wherein a communicating section through which a space on the upstream side of the shielding member communicates with the gap is formed in the shielding member.

4. The turbine blade mounting structure according to claim 2, wherein a communicating section through which a space on the upstream side of the shielding member communicates with the gap is formed in the shielding member.

5. The turbine blade mounting structure according to claim 1, wherein the shielding member is not fixed to the turbine blade and is not fixed to the disk.

6. The turbine blade mounting structure according to claim 1, further comprising a support member which faces the fitting section and is disposed on an inner circumferential side of the shielding member, the shielding member being disposed between the support member and the support section.

7. The turbine blade mounting structure according to claim 6, wherein the support member includes an annular wall section protruding from a back surface of the support member toward the end surface on the upstream side of the fitting section, the annular wall section supporting the end surface on the upstream side of the fitting section.

8. The turbine blade mounting structure according to claim 6, wherein the shielding member is not fixed to the turbine blade, is not fixed to the disk, and is not fixed to the support member.

9. The turbine blade mounting structure according to claim 1, wherein a radial length of the shielding member is less than a radial length of the fitting section.

10. The turbine blade mounting structure according to claim 1, wherein the support section includes a groove formed on an inner circumferential side of a wall section of a platform of the turbine blade, the wall section of the platform protruding to the upstream side from the end surface on the upstream side of the fitting section.

11. The turbine blade mounting structure according to claim 10, wherein the groove includes the guiding surface and a receiving surface which receives an end surface on a downstream side of the shielding member.

* * * * *